Jan. 24, 1961   C. J. WHEELER   2,968,977
PIPE GRIPPING HAVING ECCENTRICALLY JOURNALLED GRIPPING MEANS
Filed March 2, 1959   3 Sheets-Sheet 1

INVENTOR
CHARLES J. WHEELER

BY  C.T. Cross

ATTORNEY

Jan. 24, 1961 C. J. WHEELER 2,968,977
PIPE GRIPPING HAVING ECCENTRICALLY JOURNALLED GRIPPING MEANS
Filed March 2, 1959 3 Sheets-Sheet 2

INVENTOR
CHARLES J. WHEELER

BY C. T. Cross

ATTORNEY

United States Patent Office 2,968,977
Patented Jan. 24, 1961

2,968,977
PIPE GRIPPING DEVICE HAVING ECCENTRICALLY JOURNALLED GRIPPING MEANS

Charles J. Wheeler, 2078 W. Jackson St., Painesville, Ohio

Filed Mar. 2, 1959, Ser. No. 796,700

3 Claims. (Cl. 81—19)

This invention relates to pipe vises and more particularly relates to a new and improved pipe vise having easily-operated, quick-acting, pipe-gripping means.

Up to the present time, numerous types of pipe vises have been proposed and used. One of the most common prior types has been a so-called "yoke-type" pipe vise comprising an inverted U-shaped yoke element or frame pivotally secured at one free end to a base member carrying a horizontal pipe support and on its other free end is secured to a different part of the base via a hook or otherwise.

In operation, the yoke is tipped back to expose the lower jaw disposed between the yoke legs, a pipe is placed on the lower jaw and the yoke closed. Hand pressure is applied to the rigid, unyielding, pipe-gripping jaw between the free ends of the yoke via a centrally-disposed vertical screw often provided with a horizontal slidable, leverage-increasing handle. Such vises are then operated by a locking the yoke in place with the jaw raised above the pipe sufficiently and then tightening the screw to press the jaw against the pipe.

While this prior type of vise certainly is operable and is widely used, the pipe gripping action is due to the tightness of the turned screw pressing the pipe against the jaws and, consequently, slippage at times occurs unless excess diametrically-applied pressure is used; this type of pressure in some instances crushes or damages the pipe. Moreover, frequent movement of the pipe, as is typically necessary, requires in each instance, that the vertical screw be loosened and retightened tightly.

Accordingly, it is an object of this invention to provide a new and improved pipe vise having an increased resistance to turning without injuring the pipe.

A further object of the invention is the provision of a new and improved, quick-acting pipe vise.

These and other objects and advantages of the invention will more fully appear from the following description thereof.

Broadly, the apparatus of this invention comprises, in combination, article supporting means and eccentrically-disposed, pressure-applying means, i.e., eccentrically-journalled, cooperating with the article supporting means to grip pipe or other article disposed therebetween in a manner which provides a high resistance to turning of the pipe while so engaged without application of pipe crushing pressure, even to relatively thin-walled pipe or tubing.

Referring now to the accompanying drawings.

Figure 1:
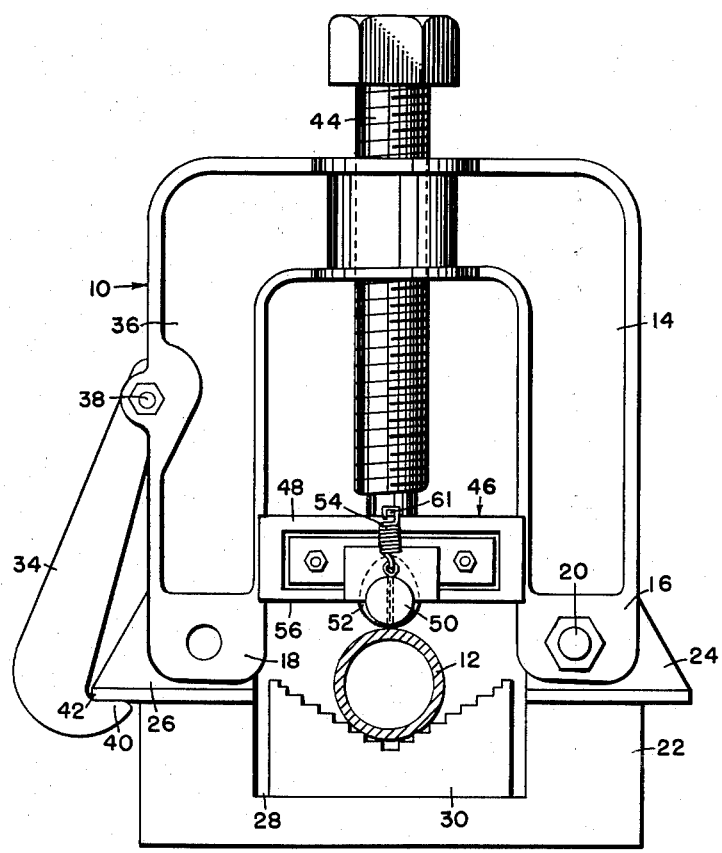
Fig. 1 is an elevational view, partially in section, of a pipe vise of the invention.

Referring more particularly to the drawings, in Fig. 1 there is shown at 10 apparatus of this invention disposed in position about a pipe 12. As there shown, the pipe vise includes an inverted U-shaped yoke or frame 14 typically formed, with a channel or other cross-section, of strong metal or alloy such as malleable iron, wrought steel, tool steel, or the like. Free end 16, of an inverted U-shaped inner cross-section of frame 14 is pivotally secured via a bolt 20 over an upstanding, blade-like element 24 on the base 22. The opposite end 18 of the frame 14 engages and fits over a corresponding, upstanding, blade-like element 26 on the base 22. A hook 34, pivotally secured to arm 36 of the frame 14 via bolt 38, engages a horizontal projection 42 on the base 22 by means of lip 40.

It will be understood that the frame 14 is pivotal about bolt 20 when hook 34 is not engaged on the projection 42 via lip 40; conversely, when the hook 34 is so engaged, the frame 14 and base 22 are locked into a rigid structure.

Figure 6:
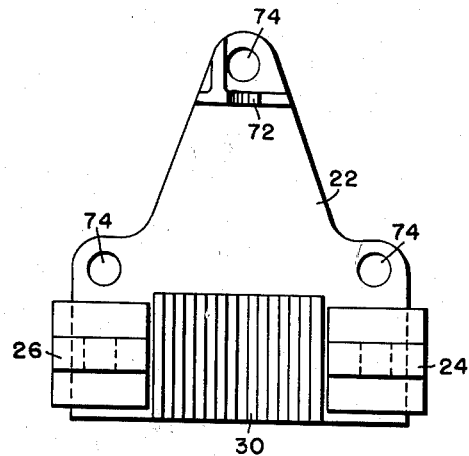
Fig. 6 is a plan view of the base and support shown in elevational view in Fig. 1.

Disposed between the upstanding blade-like elements 24 and 26 on the base 22 is a recessed central portion 28 bearing a rigid, horizontal lower pipe jaw or support comprising a generally V-shaped block 30 provided with step-like parallel edges adapted to support a pipe or other article horizontally when laid thereon. As shown in Fig. 6, a second, somewhat similar V-shaped auxiliary pipe support element 72 is also provided on the base 22. The V-shaped block 30 may be secured to the base 22 by any desired means, e.g., bolts (not shown), welding or the like; alternatively, the V-shaped support 30 may comprise an integral part of the base 22.

Rotatably-secured to the lower end of screw 44 is a pipe-contacting assembly 46 movable up and down as a unit in response to the turning of screw 44. The assembly 46 comprises a housing 48 supporting a depending, freely-oscillatable, transverse, eccentrically-journalled element 50 provided with an eccentric cam surface 52 of roughened metal, e.g., a knurled surface. The cam surface 52 is normally, resiliently biased in a desired position by spring 54 secured to element 50 and the housing 54. Thus, it will be understood that the spring action serves to normally hold the element 50 in a pre-determined position with respect to the housing 54, e.g., providing a minimum projection beneath the bottom 56 of housing 48.

Figure 2:
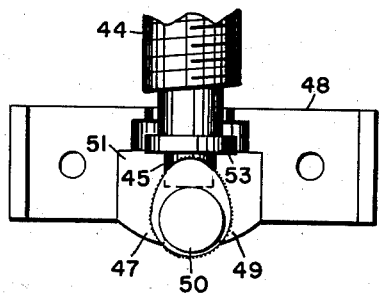
Fig. 2 is an enlarged, fragmentary view, with parts broken away for clarity, of a portion of the apparatus of Fig. 1 illustrating pressure application means of one embodiment of the invention.
Figure 3:
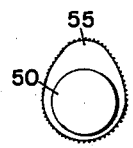
Fig. 3 is an enlarged end view of one embodiment of an eccentrically-journalled pressure-applying element of this invention.
Figure 4:
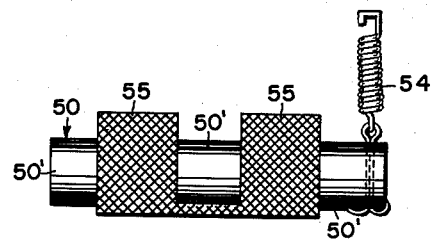
Fig. 4 is an elevational view of the element of Fig. 3 showing spring-biasing means associated therewith.

As shown in Figs. 2 and 4, the end 45 of screw 44 contacts a circular central portion 50' of the element 50 to apply pressure thereto. Alternatively, if desired, pressure can be applied to the end surfaces 50' as shown in Fig. 4. Thus, it will be understood that pressure can be applied to the two end surfaces 50' without application of pressure to the central surface 50'. It will be appreciated that the curved cam surfaces 55 are eccentrically-journalled, i.e., oscillation of the element 50 in position in housing 48 moves surfaces 55 through a minimum and maximum distance from the bottom 56 of housing 48.

Element 50 is held in place in the housing 48 at one end by lips 47 and 49, as shown in Fig. 2, engaging surface 50' at one end; the opposite end of element 50 is resiliently-urged against a curved upper shoulder by a spring 54 as shown in Figs. 1, 2 and 4.

Figure 5:
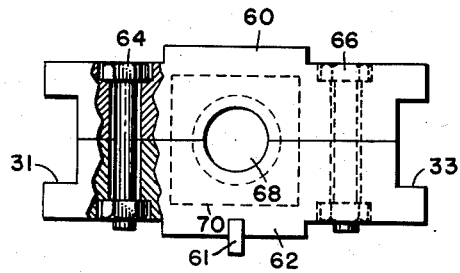
Fig. 5 is a plan view, partially in section, of the movable housing for the pressure-applying element shown in Figs. 3 and 4.

Fig. 5 shows in plan view, the housing 48 formed of two corresponding sections bolted together by bolts 64 and 66. Defined between the sections is a central aperture 68 adapted to engage the lower end of screw 44 via an annular rib thereon as shown in Fig. 2. The thus-joined sections define channels 31 and 33 which slidably engage the legs of the frame 14 and are movable up and down while disposed thereabout as shown in Fig. 1. As shown in Fig. 5, the numeral 70 designates a cubical opening in the housing 48 adapted to receive the apparatus shown in Figs. 7, 8 and 9 and to be retained therein via set screws (not shown).

Fig. 6 is a plan view of the base 22 showing mounting holes 74 by which the base can be secured to a bench or other pipe vise support.

Figure 7:
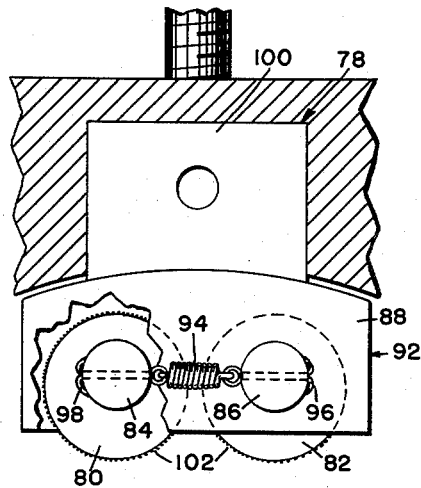
Fig. 7 is a fragmentary view, partially in section and with parts broken away for clarity, of a unit illustrating another embodiment of the invention to be used with a yoke type vise.
Figure 8:
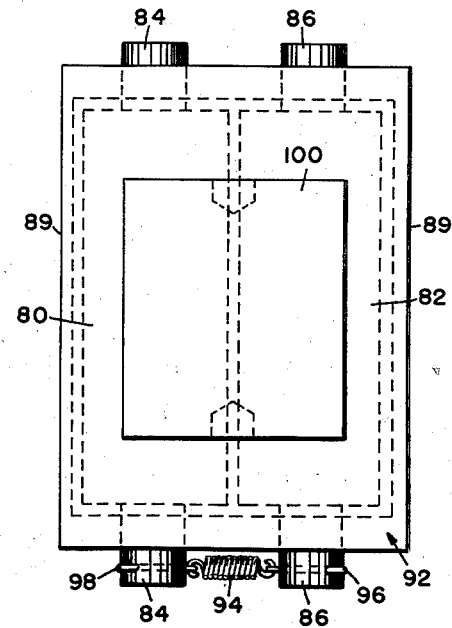
Fig. 8 is a plan view of the apparatus of Fig. 7.
Figure 9:
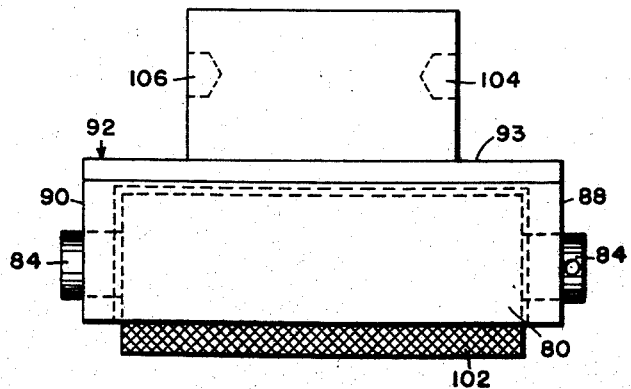
Fig. 9 is an end view of a portion of the apparatus shown in Fig. 7.

An embodiment of the present invention particularly adapted for use with prior yoke-type vises is illustrated in Figs. 7, 8 and 9. As there shown, an adapter unit, designated generally at 78, comprises an upper insert or tongue element 100 adapted to fit into and be engaged by the conventional upper jaw housing of a yoke type vise, e.g., via set screws (not shown) engaging openings 104 and 106. Secured to the lower portion of the element 100 is an enlarged housing 92 comprising sides 88 and 90, ends 89 and a top 93. Within the housing thus defined are eccentrically-journalled cylindrical elements 80 and 82. These elements are mounted via pins 84 and 86, respectively, extending from each end through sides 88 and 90. As shown, the ends of pins extending through side 88 are joined by a spring 94 via two cotter pins 96 and 98, thereby normally resiliently biasing the cylindrical elements 80 and 82 in a desired position as shown. In operation, the dual rollers 80 and 82 being eccentrically-journalled when used in the housing 48 as shown in Fig. 1 to grip the pipe 12 in the manner of element 50, or in another housing of a vise, apply to a pipe disposed in contact therewith a high resistance to turning of the pipe by virtue of the off-center movement as torque is initially applied to the pipe.

It will be appreciated that the apparatus of this invention provides a quick-acting pipe vise unit since the pipe to be gripped need not have a high degree of pressure applied via central screw 44. On the contrary, in many instances only hand pressure need be applied to the screw 44; when such pressure is applied with the cammed element 50, or elements 80 and 82, are resiliently-biased in a predetermined position. As pressure is applied, the initial turning of the pipe serves to tighten the cammed elements thereagainst. To release the tight pressure thus applied, the pipe need only be turned in the opposite direction to return the cammed element to its initial position, whereupon the screw can be easily loosened.

The various elements of the apparatus of this invention can be formed of any suitable metal or alloy. Thus, it will be appreciated that the elements 50, 80 and 82 can be fabricated from hardened tool steel, forged steel, forged alloy steel. The other elements can be formed of any suitable material such as malleable iron, wrought steel, tool steel, or the like.

It is to be understood that, although the invention has been described with specific reference to particular embodiments thereof, it is not to be so limited since changes and alterations therein may be made which are within the full intended scope of this invention as defined by the appended claims.

I claim:

1. A tool for gripping a substantially cylindrical element comprising, in combination, engagement means against which a first portion of said element may engage, eccentrically journalled gripping means for engaging a second portion of said element, said first and second portions being substantially opposite from each other, press means engaging said eccentrically journalled gripping means for pressing said eccentrically journalled gripping means against said second portion of said element and thereby press said first portion of said element against said engagement means, said eccentrically journalled gripping means comprising rotatively journalled shaft means having directly provided thereon eccentric cam surface means with a minimum dimension gripping position and a maximum dimension gripping position, said press means having bearing means for said shaft means and comprising thread means having an end portion thereof pressing against said shaft means, rotation of said shaft means in said bearing means upon attempted relative movement between said element and said eccentrically journalled gripping means generating a self-tightening action as said eccentric cam surface means tends to rotate relative to said element from a minimum dimension gripping position towards a maximum dimension gripping position.

2. A tool for gripping a substantially cylindrical element comprising, in combination, engagement means against which a first portion of said element may engage, eccentrically journalled gripping means for engaging a second portion of said element, said first and second portions being substantially opposite from each other, press means engaging said eccentrically journalled gripping means for pressing said eccentrically journalled gripping means against said second portion of said element and thereby press said first portion of said element against said engagement means, said eccentrically journalled gripping means comprising rotatively journalled shaft means having directly provided thereon eccentric cam surface means with a minimum dimension gripping position and a maximum dimension gripping position, said press means having bearing means for said shaft means and comprising thread means having an end portion thereof pressing against said shaft means, rotation of said shaft means in said bearing means upon attempted relative movement between said element and said eccentrically journalled gripping means generating a self-tightening action as said eccentric cam surface means tends to rotate relative to said element from a minimum dimension gripping towards a maximum dimension gripping position, and resilient means engaging said shaft means to normally bias same in a predetermined gripping position with said element.

3. A tool for gripping a substantially cylindrical element comprising, in combination, engagement means against which a first portion of said element may engage, eccentrically journalled gripping means for engaging a second portion of said element, said first and second portions being substantially opposite from each other, press means engaging said eccentrically journalled gripping means for pressing said eccentrically journalled gripping means against said second portion of said element and thereby press said first portion of said element against said engagement means, said eccentrically journalled gripping means comprising rotatively journalled shaft means, said shaft means comprising first and second substantially parallel shafts spaced apart from each other in a side-by-side relationship, each of said shafts having directly provided thereon eccentric cam surface means with a minimum dimension gripping position and a maximum dimension gripping position, said press means having bearing means for said shaft means and comprising thread means having an end portion thereof pressing against said shaft means, rotation of said shaft means in said bearing means upon attempted relative movement between said element and said eccentrically journalled gripping means generating a self-tightening action as said eccentric cam surface means tends to rotate relative to said element from a minimum dimension gripping position towards a maximum dimension gripping position.

(References on following page)

References Cited in the file of this patent

UNITED STATES PATENTS

| | | |
|---|---|---|
| 524,330 | Lane | Aug. 14, 1894 |
| 728,945 | Levy | May 26, 1903 |
| 838,143 | Seymour | Dec. 11, 1906 |
| 1,198,365 | Manney | Sept. 12, 1916 |
| 1,261,723 | Duffy | Apr. 2, 1918 |
| 1,419,452 | Fraser | June 13, 1922 |
| 1,834,697 | Giles | Dec. 1, 1931 |
| 2,514,687 | Werner | July 11, 1950 |
| 2,805,593 | Darrow | Sept. 10, 1957 |
| 2,851,913 | Ramoneda | Sept. 16, 1958 |